(12) United States Patent
Lousenberg

(10) Patent No.: US 8,058,319 B2
(45) Date of Patent: Nov. 15, 2011

(54) PROCESS TO PREPARE FLUOROPOLYMER DISPERSIONS AND MEMBRANES

(75) Inventor: Robert D. Lousenberg, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 1127 days.

(21) Appl. No.: 11/750,391

(22) Filed: May 18, 2007

(65) Prior Publication Data

US 2007/0282022 A1    Dec. 6, 2007

Related U.S. Application Data

(60) Provisional application No. 60/809,929, filed on Jun. 1, 2006.

(51) Int. Cl.
*C08J 5/20*    (2006.01)

(52) U.S. Cl. .................. 521/27; 521/31; 524/544; 562/1

(58) Field of Classification Search .................... 521/27, 521/31; 524/544; 562/1
See application file for complete search history.

(56) References Cited

U.S. PATENT DOCUMENTS

| | | | |
|---|---|---|---|
| 3,282,875 A | 11/1966 | Connolly et al. | |
| 3,664,915 A | 5/1972 | Gore | |
| 3,953,566 A | 4/1976 | Gore | |
| 3,962,153 A | 6/1976 | Gore | |
| 4,030,988 A | 6/1977 | Grot | |
| 4,126,589 A | 11/1978 | Hamada et al. | |
| 4,187,390 A | 2/1980 | Gore | |
| 4,358,545 A | 11/1982 | Ezzell et al. | |
| 4,433,082 A | 2/1984 | Grot | |
| 4,453,991 A | 6/1984 | Grot | |
| 4,731,263 A | 3/1988 | Martin et al. | |
| 4,940,525 A | 7/1990 | Ezzell et al. | |
| 6,025,092 A | 2/2000 | Doyle et al. | |
| 6,090,895 A | 7/2000 | Mao et al. | |
| 6,649,703 B2 | 11/2003 | Michot et al. | |
| 6,733,914 B1 | 5/2004 | Grot et al. | |
| 7,402,351 B2 * | 7/2008 | Dai | 429/429 |
| 7,507,771 B2 * | 3/2009 | Cao et al. | 521/25 |
| 2002/0160271 A1 | 10/2002 | Frech et al. | |
| 2002/0160272 A1 | 10/2002 | Tanaka et al. | |
| 2004/0121210 A1 | 6/2004 | Hamrock et al. | |
| 2004/0122256 A1 * | 6/2004 | Ikeda et al. | 562/1 |
| 2005/0124769 A1 | 6/2005 | Haring | |
| 2007/0008142 A1 | 1/2007 | Crowe et al. | |
| 2007/0082247 A1 | 4/2007 | Lee et al. | |
| 2007/0278094 A1 | 12/2007 | Lousenberg | |
| 2007/0281198 A1 | 12/2007 | Lousenberg | |
| 2007/0281199 A1 | 12/2007 | Lousenberg | |
| 2007/0282023 A1 | 12/2007 | Lousenberg | |

FOREIGN PATENT DOCUMENTS

| | | |
|---|---|---|
| EP | 0 066 369 A1 | 12/1982 |
| EP | 0 079 218 A | 5/1983 |
| EP | 0 030 104 A1 | 8/1984 |
| EP | 1 359 142 A | 11/2003 |
| EP | 1359142 A1 * | 11/2003 |
| EP | 0 973 809 B1 | 4/2004 |
| EP | 1 239 000 A | 11/2007 |
| WO | WO 98/16581 A | 10/1997 |
| WO | WO 98/51403 A1 | 11/1998 |
| WO | WO 00/24709 A2 | 5/2000 |
| WO | WO 01/27167 A | 4/2001 |
| WO | WO-02/062749 A1 * | 8/2002 |
| WO | WO-2004/018526 A1 * | 3/2004 |
| WO | WO 2004/018526 A1 | 3/2004 |
| WO | WO 2005/001978 A2 | 1/2005 |
| WO | WO-2008/013601 A1 * | 1/2008 |

OTHER PUBLICATIONS

International Search Report PCT/US2007/012507, International Filing Date, May 24, 2007.

* cited by examiner

*Primary Examiner* — Peter D. Mulcahy
*Assistant Examiner* — Henry Hu

(57) ABSTRACT

Described is a process to prepare fluoropolymer organic-liquid dispersions containing a homogeneous mixture of reacted and unreacted sulfonyl halide groups. The dispersions are useful in the preparation of crosslinked membranes.

23 Claims, No Drawings

PROCESS TO PREPARE FLUOROPOLYMER DISPERSIONS AND MEMBRANES

This application claims the benefit of U.S. Provisional Application No. 60/809,929 filed Jun. 1, 2006.

1. Field of Invention

The invention is directed to a process to prepare fluoropolymer organic-liquid dispersions containing a homogeneous mixture of reacted and unreacted sulfonyl halide groups. The dispersions are useful in the preparation of crosslinked membranes.

2. Background

Electrochemical cells generally include an anode electrode and a cathode electrode separated by an electrolyte, where a proton exchange membrane (hereafter "PEM") is used as a polymer electrolyte. A metal catalyst and electrolyte mixture is generally used to form the anode and cathode electrodes. A well-known use of electrochemical cells is for fuel cells (a cell that converts fuel and oxidants to electrical energy). Fuel cells are typically formed as stacks or assemblages of membrane electrode assemblies (MEAs), which each include a PEM, an anode electrode and cathode electrode, and other optional components. In such a cell, a reactant or reducing fluid such as hydrogen or methanol is supplied to the anode, and an oxidant such as oxygen or air is supplied to the cathode. The reducing fluid electrochemically reacts at a surface of the anode to produce hydrogen ions and electrons. The electrons are conducted to an external load circuit and then returned to the cathode, while hydrogen ions transfer through the electrolyte to the cathode, where they react with the oxidant and electrons to produce water and release thermal energy.

Long term stability of the PEM is critically important for fuels cells. For example, the lifetime goal for stationary fuel cell applications is 40,000 hours of operation while automotive applications require a lifetime of at least 10,000 hours. However, typical membranes found in use throughout the art will degrade over time compromising MEA viability and performance. For example, stresses induced as a consequence of dimensional changes with hydration or dehydration during fuel cell cycling can cause creep and ultimately membrane failure. One solution to this problem is to provide cross-links within the body of the membrane. However, the ability to homogeneously crosslink some polymer electrolytes, such as fluoropolymer electrolytes, is limited due to the difficulties of preparing crosslinkable solutions or dispersions in the limited solvents or organic liquid media that can be used with fluoropolymer electrolytes.

Solvent or dispersion casting is a common and advantageous fuel cell membrane fabrication process. Well-known fluoropolymer electrolyte dispersions that are in widespread commercial use are Nafion® perfluoroionomers available from E. I. du Pont de Nemours and Company, Wilmington Del. The solutions and dispersions used to form the membranes are also frequently used to make catalyst ink formulations that are used to form the electrodes of the fuel cell MEA. Fluoropolymer electrolyte dispersions suitable for casting membranes are disclosed in U.S. Pat. Nos. 4,433,082 and 4,731,263, which teach aqueous organic and organic-liquid fluoropolymer electrolyte dispersion compositions in sulfonic acid ($SO_3H$) and sulfonate ($SO_3^-$) form with no significant sulfonyl fluoride ($SO_2F$) concentrations.

U.S. Pat. No. 3,282,875 discloses that the $SO_2F$ group of a precursor fluoropolymer electrolyte might be used to crosslink or "vulcanize" the fluoropolymer by reaction with di- or multifunctional crosslinking agents but did not disclose a method to do this homogeneously. U.S. Pat. No. 6,733,914 discloses a method for heterogeneously converting a significant fraction of the $SO_2F$ groups of Nafion®-like polymer membranes to $SO_3^-$ and sulfonamide ($SO_2NH_2$) groups by reaction with aqueous ammonia. The membranes were subsequently crosslinked by a heat-annealing step at high temperature in which some of the $SO_2NH_2$ groups presumably reacted with residual the $SO_2F$ groups to form sulfonimide ($-SO_2NHSO_2-$) crosslinks. The heterogeneous nature of the front reaction with aqueous ammonia did not provide a homogeneous crosslink density throughout the film.

The $SO_2F$ precursor form of highly fluorinated or Nafion®-like fluoropolymer electrolyte materials are not readily soluble or dispersible in common organic liquids but may be soluble in fluorinated solvents under certain conditions. However, the cost and environmental concerns associated with fluorinated solvents would likely preclude their use as a large-scale solvent for dispersion casting medium. Furthermore, many conceivable crosslinking agents that might react with the $SO_2F$ groups are insignificantly soluble in fluorinated solvents but may be soluble in common organic liquids. Thus, it is desirable to develop a simple and facile process for preparing fluoropolymer electrolyte dispersions containing significant but less than 100% remaining $SO_2F$ group concentrations with common non-fluorinated liquids or solvents. The dispersions can be easily cast into membranes and homogeneously crosslinked for use in fuel cells and similar technologies.

SUMMARY

The invention is directed to a method to produce a polymer dispersion, comprising the steps of: providing a solution comprising a polymer solvent and a polymer containing pendant $SO_2X$ groups, wherein the polymer comprises a fluorinated backbone and pendant groups described by the formula $-(O-CF_2CFR_f)_a-(O-CF_2)_b-(CFR'_f)_c SO_2X$, where X is a halogen, $R_f$ and $R'_f$ are independently selected from F, Cl or a perfluorinated alkyl group having 1 to 10 carbon atoms, a=0 to 2, b=0 to 1, and c=0 to 6; combining the solution with a nucleophilic compound Y and a polar liquid, to form a reaction mixture; and removing by distillation substantially all of the polymer solvent from the reaction mixture to form a dispersion wherein about 5% to about 95% of the pendant $SO_2X$ groups have reacted with the nucleophilic compound Y and about 95% to about 5% of the pendant $SO_2X$ groups remain unreacted.

The invention is also directed to a method to prepare a membrane comprising the steps of: providing the dispersion according to the steps described immediately above; and preparing a membrane from the dispersion.

In one embodiment the method additionally comprises the step of mixing the reaction mixture of the second step or the dispersion of the third step with a crosslinkable compound to form crosslinks between pendant groups. The crosslinks can comprise one or more sulfonimide moieties.

The invention is also directed to a dispersion made by the methods above, and to a membrane prepared from the dispersions.

DETAILED DESCRIPTION

Where a range of numerical values is recited herein, unless otherwise stated, the range is intended to include the endpoints thereof, and all integers and fractions within the range. It is not intended that the scope of the invention be limited to the specific values recited when defining a range. Moreover, all ranges set forth herein are intended to include not only the particular ranges specifically described, but also any combination of values therein, including the minimum and maximum values recited.

Fuel cells are electrochemical devices that convert the chemical energy of a fuel, such as a hydrogen gas, and an oxidant, such as air, into electrical energy. Fuel cells are typically formed as stacks or assemblages of membrane electrode assemblies (MEAs), which each include an electrolyte, an anode (a negatively charged electrode) and cathode (a positively charged electrode), and other optional components. A polymeric proton exchange membrane (PEM) is frequently used as the electrolyte. Fuel cells typically also comprise a porous electrically conductive sheet material that is in electrical contact with each of the electrodes and permits diffusion of the reactants to the electrodes, and is know as a gas diffusion layer, gas diffusion substrate or gas diffusion backing. When the electrocatalyst is coated on the PEM, the MEA is said to include an catalyst coated membrane (CCM). In other instances, where the electrocatalyst is coated on the gas diffusion layer, the MEA is said to include gas diffusion electrode(s) (GDE). The functional components of fuel cells are normally aligned in layers as follows: conductive plate/gas diffusion backing/anode electrode/membrane/cathode electrode/gas diffusion backing/conductive plate.

Membranes made from the dispersions and by the processes described herein, particularly when converted to ionomeric acid form, can be used in conjunction with fuel cells utilizing a PEM. Examples include hydrogen fuel cells, reformed-hydrogen fuel cells, direct methanol fuel cells or other organic/air (e.g. those utilizing organic fuels of ethanol, propanol, dimethyl- or diethyl ethers, formic acid, carboxylic acid systems such as acetic acid, and the like). The membranes are also advantageously employed in MEA's for electrochemical cells. Other uses for the membranes and processes described herein include use in batteries and other types of electrochemical cells and use in cells for the electrolysis of water to form hydrogen and oxygen.

The PEM is typically comprised of an ion exchange polymer, also known as an ionomer. Following the practice of the art, the term "ionomer" is used to refer to a polymeric material having a pendant group with a terminal ionic group. The terminal ionic group may be an acid or a salt thereof as might be encountered in an intermediate stage of fabrication or production of a fuel cell. Proper operation of an electrochemical cell may require that the ionomer be in acid form. Highly fluorinated ionomers are frequently used in PEMs. The present invention is directed to methods useful for producing certain such highly fluorinated polymers.

One aspect of the invention is directed to a method to produce a polymer dispersion containing significant and homogeneously dispersed sulfonyl halide ($SO_2X$) groups in a non-fluorinated liquid. The method comprises the steps of:
a) providing a solution comprising a polymer solvent and a polymer containing pendant $SO_2X$ groups, wherein the polymer comprises a fluorinated backbone containing pendant groups described by the formula $-(O-CF_2CFR_f)_a-(O-CF_2)_b-(CFR'_f)_c SO_2X$, where X is a halogen, $R_f$ and $R'_f$ are independently selected from F, Cl or a perfluorinated alkyl group having 1 to 10 carbon atoms, a=0 to 2, b=0 to 1, and c=0 to 6;
b) combining the solution of step a) with a nucleophilic compound Y and a polar liquid, in any order, to form a reaction mixture; and
c) removing by distillation substantially all of the polymer solvent from the reaction mixture of step b) to form a dispersion wherein about 5% to about 95% of the pendant $SO_2X$ groups have reacted with the nucleophilic compound Y and about 95% to about 5% of the pendant $SO_2X$ groups remain unreacted.

The polymer may be a homopolymer or a copolymer of any configuration, such as a block or random copolymer. By "fluorinated backbone" it is meant that at least 80% of the total number of halogen and hydrogen atoms on the backbone of the polymer are fluorine atoms. The polymer may also be perfluorinated, which means that 100% of the total number of halogen and hydrogen atoms on the backbone are fluorine atoms. One type of suitable polymer is a copolymer of a first fluorinated vinyl monomer and a second fluorinated vinyl monomer having one or more $SO_2X$ groups. Possible first monomers include tetrafluoroethylene (TFE), hexafluoropropylene, vinylidine fluoride, trifluoroethylene, chlorotrifluoroethylene, perfluoroalkylvinyl ether, and mixtures thereof. Possible second monomers include a variety of fluorinated vinyl ethers with a $SO_2X$ group. X can be any halogen or a combination of more than one halogen, and is typically F.

Suitable homopolymers and copolymers that are known in the art include those described in WO 2000/0024709 and U.S. Pat. No. 6,025,092. A suitable fluoropolymer that is commercially available is Nafion® fluoropolymer from E. I. du Pont de Nemours and Company, Wilmington Del. One type of Nafion® fluoropolymer is a copolymer of tetrafluoroethylene (TFE) with perfluoro(3,6-dioxa-4-methyl-7-octenesulfonyl fluoride) (PSEPVE), as disclosed in U.S. Pat. No. 3,282,875. Other suitable fluoropolymers are copolymers of TFE with perfluoro(3-oxa-4-pentenesulfonyl fluoride) (PSEVE), as disclosed in U.S. Pat. Nos. 4,358,545 and 4,940,525, and copolymers of TFE with $CF2=CFO(CF_2)_4SO_2F$, as disclosed in U.S. Patent Application 2004/0121210. The polymer may comprise a perfluorocarbon backbone and pendant groups of the formula $-O-CF_2CF(CF_3)-O-CF_2CF_2SO_2F$. Polymers of this type are disclosed in U.S. Pat. No. 3,282,875. All of these copolymers can be converted later to the ionomeric form by hydrolysis, typically by exposure to an appropriate aqueous base, as disclosed in U.S. Pat. No. 3,282,875.

The polymer is typically first dissolved in a solvent for the polymer at a concentration typically between 1 and 30% (weight % or w/w) and preferably between 10 and 20% (w/w). By "polymer solvent" is meant a solvent that will dissolve and solvate the $SO_2X$ form of the polymer and not otherwise react with or degrade the polymer. Typically the polymer solvent is fluorinated. By "fluorinated" it is meant that at least 10% of the total number of hydrogen and halogen atoms in the solvent are fluorine. Examples of suitable polymer solvents include, but are not limited to, fluorocarbons (a compound containing only carbon and fluorine atoms), fluorocarbon ethers (a fluorocarbon additionally containing an ether linkage), hydrofluorocarbons (a compound containing only carbon, hydrogen and fluorine atoms), hydrofluorocarbon ethers (a hydrofluorocarbon additionally containing an ether linkage), chlorofluorocarbons (a compound containing only carbon, chlorine and fluorine atoms), chlorofluorocarbon ethers (a chlorofluorocarbon additionally containing an ether linkage), 2H-perfluoro(5-methyl-3,6-dioxanonane), and Fluorinert® electronic liquids (3M, St. Paul, Minn.). Suitable solvents also include fluorochemical solvents from E. I. DuPont de Nemours (Wilmington, Del.) A mixture of one or more different polymer solvents may also be used.

The $SO_2X$ form polymer is dissolved with stirring and may require heating for efficient dissolution. The dissolution temperature may be dependent on the polymer composition or $SO_2X$ concentration as measured by the equivalent weight (EW). For the purposes of this application, EW is defined to be the weight of the polymer in sulfonic acid form required to neutralize one equivalent of NaOH, in units of grams per mole (g mol$^{-1}$). High EW polymers (i.e. low SO$_2$X concentration) may require higher dissolution temperatures. When the maximum dissolution temperature at atmospheric pressure is limited by the boiling point of the solvent, a suitable pressure vessel may be used to increase the dissolution temperature. The polymer EW may be varied as desired for the particular application. Herein, polymers with EW less than or equal to 1500 g mol$^{-1}$ are typically employed, more typically less than about 900 g mol$^{-1}$.

Next, a reactive mixture is formed by mixing a nucleophilic compound, Y, and a polar liquid, with the polymer solution. The terms "nucleophilic" and "nucleophile" are recognized in the art as pertaining to a chemical moiety having a reactive pair of electrons. More specifically herein, the nucleophilic compound Y is capable of displacing the halogen X of the polymer SO$_2$X groups through a substitution type reaction, and forming a covalent bond with sulfur. Suitable nucleophilic compounds may include but are not limited to, water, alkali metal hydroxides, alcohols, amines, hydrocarbon and fluorocarbon sulfonamides. The amount of the nucleophilic compound Y added is generally less than stoichiometric and will determine the % of SO$_2$X groups that will remain unreacted.

By "polar liquid" it is meant any compound that is liquid at process conditions and refers to a single liquid or to a mixture of two or more polar liquids, wherein the liquid(s) have a dipole moment of about 1.5 debye units or higher, typically 2-5. More specifically, suitable polar liquids should be capable of solvating the nucleophile Y, the reacted form of Y with the polymer SO$_2$X groups, but not necessarily solvate the bulk polymer. Suitable polar liquids include, but are not limited to dimethylformamide (DMF), dimethylacetamide (DMAC), N-methylpyrrolidone (NMP), dimethyl sulfoxide (DMSO), acetonitrile, propylene carbonate, methanol, ethanol, water, or combinations thereof. Suitable polar liquids preferably have a boiling point higher than the solvent for the polymer.

The nucleophilic compound Y and polar liquid may be added to the polymer solution in any order. Typically, the nucleophile Y and some or all of the polar liquid are added simultaneously as a mixture to the polymer solution. Additional polar liquid or a different polar liquid may be added in a separate step. Other compounds may be added simultaneously or sequentially in any order with Y and the polar liquid. For example, when Y is water, non-nucleophilic bases can be added, such as but not limited to LiH, NaH, and NR$^4$R$^5$R$^6$, wherein R$^4$, R$^5$ and R$^6$ are optionally substituted alkyl or aryl groups. The polar liquid and the nucleophile Y may also be the same compound. In one example, when water is functioning as both polar liquid and the nucleophile Y, a non-nucleophilic base as described above may need to be present.

The nucleophilic compound and polar liquid are preferably added to the polymer solution with fast turbulent mixing and at a temperature close to the dissolution temperature. When the dissolution temperature is low, the polymer solution temperature can be increased, typically above 50° C., prior to addition of the nucleophilic compound Y and polar liquid. A suitable pressure vessel can be used to increase the polymer solution temperature if it is limited due to the boiling points of the solvent, nucleophile Y, or polar liquid. The reaction, in which the nucleophilic compound Y displaces the halogen X of the polymer SO$_2$X groups, is typically complete within 5 minutes to 2 hours following the addition of the nucleophile and polar liquid.

Next, the reaction mixture is distilled to remove substantially all of the polymer solvent from the mixture. The distillation is preferably done at atmospheric pressure but may be done under vacuum. The distillation is considered complete when the still pot temperature approaches the boiling point of the polar liquid or the polar liquid begins to distill. Trace amounts of the polymer solvent may remain after distillation. The distillation may be repeated one or more times, optionally with additional polar liquid as needed to adjust viscosity. The remaining reaction mixture will be in the form of a dispersion with about 5% to about 95% of the pendant SO$_2$X groups having reacted with the nucleophilic compound Y and about 95% to about 5% of the pendant SO$_2$X groups remaining unreacted. Preferably, about 25% to about 75% of the pendant SO$_2$X groups are reacted with the nucleophilic compound Y with about 75% to about 25% of the pendant SO$_2$X groups remaining unreacted. The dispersion may also be filtered to remove insolubles. By "dispersion" it is meant a physically stable, homogenous mixture of fine particles of the polymer in the solvent, i.e. a mixture that does not separate into separate phases.

As defined herein, a dispersion results when the polar liquid is a good solvent for the reacted form of the nucleophile Y with the polymer pendent SO$_2$X groups but not necessarily a solvent for the bulk polymer. The exact reacted form of the SO$_2$X group will depend on the nucleophile used. For example, when water in the presence of a non-nucleophilic base such as triethylamine (TEA) is used, the reacted form will be a triethylammonium sulfonate salt (SO$_3^-$TEAH$^+$). Typically the pendant group is converted to SO$_3$M, wherein M is a univalent cation.

In another embodiment of the invention, a compound of the formula HNR$^1$R$^2$ may be added to the reaction mixture of steps (b) and (c) referred to previously so that about 1% to about 100% of the remaining pendant SO$_2$X groups are converted to pendant SO$_2$NR$^1$R$^2$ groups, wherein R$^1$ and R$^2$ are independently hydrogen or optionally substituted alkyl or aryl groups. The amount of SO$_2$X groups that are converted can be controlled by the amount of compound of the formula HNR$^1$R$^2$ added to the reaction mixture. Suitable substituents include but are not limited to ether oxygens, halogens, and amine functionalities. Typically R$^1$ and R$^2$ are hydrogen, alkyl, or aryl hydrocarbon groups.

Other aspects of the invention are polymer dispersions made by any of the processes discussed above, and membranes prepared from the dispersions. Preparation of membranes are discussed hereinafter.

In another embodiment novel polymer dispersions are disclosed that include one or more polar liquids and a polymer with a fluorinated backbone comprising about 5% to about 95% pendant groups, preferably about 25% to about 75%, described by the formula —(O—CF$_2$CFR$_f$)$_a$—(O—CF$_2$)$_b$—(CFR'$_f$)$_c$SO$_2$Q, and about 95% to about 5% pendant groups, preferably about 75% to about 25%, described by the formula —(O—CF$_2$CFR$_f$)$_a$—(O—CF$_2$)$_b$—(CFR'$_f$)$_c$SO$_2$X, where Q is a halogen or NR$^1$R$^2$, or mixture thereof, R$^1$ and R$^2$ are independently hydrogen or optionally substituted alkyl groups, R$_f$ and R'$_f$ are independently selected from F, Cl or a perfluorinated alkyl group having 1 to 10 carbon atoms, a=0 to 2, b=0 to 1, c=0 to 6, and M is hydrogen or one or more univalent cation. The polar liquid can be a mixture and can comprise at least one polar liquid as defined above, and can also comprise water.

The polymer dispersions can be formed into membranes using any conventional method such as but not limited to solution or dispersion film casting techniques. The membrane thickness can be varied as desired for a particular electrochemical application. Typically, the membrane thickness is less than about 350 µm, more typically in the range of about 25 µm to about 175 µm. If desired, the membrane can be a laminate of two polymers such as two polymers having different EW. Such films can be made by laminating two membranes. Alternatively, one or both of the laminate components can be cast from solution or dispersion. When the membrane is a laminate, the chemical identities of the monomer units in the additional polymer can independently be the same as or different from the identities of the analogous monomer units of the first polymer. One of ordinary skill in the art will understand that membranes prepared from the dispersions will have utility in packaging, in non-electrochemical membrane applications, as an adhesive or other functional layer in a multi-layer film or sheet structure, and other classic applications for polymer films and sheets which are outside electrochemistry. For the purposes of the present invention, the term "membrane," a term of art in common use is synonymous with the terms "film" or "sheet" which are terms of art in more general usage but refer to the same articles.

The membrane may optionally include a porous support or reinforcement for the purposes of improving mechanical properties, for decreasing cost and/or other reasons. The porous support may be made from a wide range of materials, such as but not limited to non-woven or woven fabrics, using various weaves such as the plain weave, basket weave, leno weave, or others. The porous support may be made from glass, hydrocarbon polymers such as polyolefins, (e.g., polyethylene, polypropylene), perhalogenated polymers such as polychlorotrifluoroethylene. Porous inorganic or ceramic materials may also be used. For resistance to thermal and chemical degradation, the support preferably is made from a fluoropolymer, most preferably a perfluoropolymer. For example, the perfluoropolymer of the porous support can be a microporous film of polytetrafluoroethylene (PTFE) or a copolymer of tetrafluoroethylene with $CF_2\!=\!CFC_nF_{2n+1}$ (n=1 to 5) or $(CF_2\!=\!CFO\!-\!(CF_2CF(CF_3)O)_mC_nF_{2n+1}$ (m=0 to 15, n=1 to 15). Microporous PTFE films and sheeting are known which are suitable for use as a support layer. For example, U.S. Pat. No. 3,664,915 discloses uniaxially stretched film having at least 40% voids. U.S. Pat. Nos. 3,953,566, 3,962,153 and 4,187,390 disclose porous PTFE films having at least 70% voids.

The porous support or reinforcement may be incorporated by coating the polymer dispersions described above on the support so that the coating is on the outside surfaces as well as being distributed through the internal pores of the support. Alternately or in addition to impregnation, thin membranes can be laminated to one or both sides of the porous support. When the polar liquid dispersion is coated on a relatively non-polar support such as microporous PTFE film, a surfactant may be used to facilitate wetting and intimate contact between the dispersion and support. The support may be pre-treated with the surfactant prior to contact with the dispersion or may be added to the dispersion itself. Preferred surfactants are anionic fluorosurfactants such as Zonyl® from E. I. du Pont de Nemours and Company, Wilmington Del. A more preferred fluorosurfactant is the sulfonate salt of Zonyl® 1033D.

The membranes from the dispersions described above can be homogeneously crosslinked by processes which form covalent bonds between the polymer pendant groups. One method comprises the addition of crosslinkable compounds to the dispersion before the membrane is formed. These are defined herein as compounds with the potential to form crosslinks with the pendant $SO_2X$ groups. The crosslinkable compounds can be also be formed in situ. The latter may be done by converting some or all of the polymer $SO_2X$ groups to a functionality with the potential for reacting with additional or remaining $SO_2X$ groups. Desirable crosslinkable compounds are at least bi-functional, with two or more potentially reactive groups, so that one group would react with one type of pendant group present on the polymer. Other potentially reactive groups on the crosslinkable compound would react with the same or different types of polymer pendant groups. Membranes manufactured and containing the crosslinkable compounds are then subjected to conditions favorable for crosslinking.

Suitable crosslinkable compounds include any molecule capable of facilitating bonding to two or more pendent groups and include, but are not limited to, ammonia, diamines, carboxyl amides, and sulfonamides. The crosslinks between polymer pendant groups typically comprise one or more sulfonimide ($-SO_2NHSO_2-$) crosslinks. In one embodiment, ammonia is added to the polymer dispersion as the crosslinkable compound so that 1% to 100% of the remaining pendant $SO_2X$ groups are converted to pendant sulfonamide ($SO_2NH_2$) groups. The resulting dispersion may be blended with additional dispersion containing $SO_2X$ groups and a membrane is manufactured by casting. A high temperature annealing step additionally facilitates anhydrous conditions within the membrane, which can be critical during crosslinking. The membrane is then subjected to conditions which facilitate a crosslinking reaction between pendant $SO_2X$ and $SO_2NH_2$ groups. Typically this is done by exposure to a compound capable of promoting the crosslinking reaction, which is known as a crosslinking promoter. Examples of crosslinking promoters include non-nucleophilic bases. Preferred crosslinking promoters are trialkylamine bases such as triethylamine, tripropylamine, tributylamine, and N,N,N',N'-tetramethylethylenediamine. Temperatures at or near the boiling point of the trialkylamine base are desirable for crosslinking.

In another crosslinking embodiment, crosslinks between polymer pendant groups that contain more than one sulfonimide moiety can be achieved by the addition of a separate crosslinkable compound to the dispersion. The compound may contain additional sulfonimide groups and/or at least two sulfonamide groups. One suitable compound is of the formula $HNR^7SO_2R^8SO_2NHR^9$, wherein $R^7$ and $R^9$ are independently hydrogen or optionally substituted alkyl groups, and $R^8$ is a substituted or unsubstituted alkyl, a substituted or unsubstituted aryl, a substituted sulfonimide polymer, an ionene polymer, or a substituted or unsubstituted heteroatomic function. Addition of this compound would facilitate crosslinks containing a $-SO_2NR^7SO_2R^8SO_2NR^9SO_2-$ moiety. A desirable crosslink of this type is $-SO_2NHSO_2(CF_2)_4SO_2NHSO_2-$.

A crosslinked polymer membrane that still contains $SO_2X$ groups can be converted to the sulfonate ($SO_3^-$) form, which is sometimes referred to as ionic or ionomeric form, by hydrolysis using methods known in the art. For example, the membrane may be hydrolyzed to convert it to the sodium sulfonate form by immersing it in 25% by weight NaOH for about 16 hours at a temperature of about 90° C. followed by rinsing the film twice in deionized 90° C. water using about 30 to about 60 minutes per rinse. Another possible method employs an aqueous solution of 6-20% of an alkali metal hydroxide and 5-40% polar organic solvent such as DMSO with a contact time of at least 5 minutes at 50-100° C. followed by rinsing for 10 minutes. After hydrolyzing, the membrane can be converted if desired to another ionic form by contacting the membrane in a bath containing salt solution of the desired cation or, to the acid form, by contacting with an acid such as nitric acid and rinsing. For fuel cell use, the membrane is usually in the sulfonic acid form.

Membrane electrode assemblies (MEA) and fuel cells therefrom are well known in the art and can comprise any of the membranes described above. One suitable embodiment is described herein. An ionomeric polymer membrane is used to form a MEA by combining it with a catalyst layer, comprising a catalyst such as platinum, which is unsupported or supported on carbon particles, a binder such as Nafion® fluoropolymer, and a gas diffusion backing. The catalyst layers may be made from well-known electrically conductive, catalytically active particles or materials and may be made by methods well known in the art. The catalyst layer may be formed as a film of a polymer that serves as a binder for the catalyst particles. The binder polymer can be a hydrophobic polymer, a hydrophilic polymer or a mixture of such polymers. The binder polymer is typically ionomeric and can be the same ionomer as in the membrane. A fuel cell is constructed from a single MEA or multiple MEAs stacked in series by further providing porous and electrically conductive anode and cathode gas diffusion backings, gaskets for sealing the edge of the MEA(s), which also provide an electrically insulating layer, graphite current collector blocks with flow fields for gas distribution, aluminum end blocks with tie rods to hold the fuel cell together, an anode inlet and outlet for fuel such as hydrogen, a cathode gas inlet and outlet for oxidant such as air.

EXAMPLES 1-8

Poly(PSEPVE-co-TFE) and Poly(PSEVE-co-TFE) Partial Hydrolysis and Dispersion Formation

EXAMPLE 1

52.3-g of poly(PSEPVE-co-TFE), which is a copolymer of tetrafluoroethylene (TFE) and perfluoro(3,6-dioxa-4-methyl-7-octenesulfonyl fluoride) (PSEPVE), having an equivalent weight of 647-g mol$^{-1}$ (80.8-mmol SO$_2$F) were cut into small pieces and placed in a dry 1-L 3-neck round bottom (RB) flask. The flask was fitted with mechanical stirring, heating mantle, a reflux condenser with nitrogen pad, and thermocouple. Approximately 185-mL of 2H-perfluoro(5-methyl-3,6-dioxanonane) (Freon® E2) was added and the polymer slowly dissolved over 0.5-h with stirring and heating to a gentle reflux. Heating was reduced and the solution cooled to between 50-70° C. Subsequent slow addition of 60-mL of N,N-dimethylformamide (DMF) by syringe (about 320-RPM stirring) resulted in a translucent mixture. A solution of 4.90-g (48.4-mmol) triethylamine (TEA), 1.74-g water (96.7-mmol), and about 20-mL of DMF was then added by syringe over 5-minutes. After 10 minutes, the mixture took on a white emulsion appearance. An additional 86-mL of DMF was added by syringe. The mixture was heated to about 80 to 90° C. with continued stirring (approximately 320-RPM) and held at temperature for about 1 hour (h). The reflux condenser was then replaced with a short path distillation apparatus. The emulsion was distilled at atmospheric pressure with a slow nitrogen sparge across the top of the still pot. Distillate was collected at a still head temperature that started at approximately 62° C. and climbed to approximately 79° C. for the duration of the distillation. The majority of the E2 was distilled off leaving a transparent and nearly colorless solution. Residual water was measured by Karl Fisher (KF) titration at about 230 PPM. Weight percent solids was measured by hot plate drying followed by vacuum oven drying (about 60° C., 29.5"-Hg) until constant weight was achieved and found to be 28.1%. A sample of the dispersion was diluted to approximately 5% (w/w) with acetone-d$_6$. A non-referenced $^{19}$F NMR of the 5% dispersion showed a remaining SO$_2$F peak at about 43.8-PPM (1F, integral area=32.9) and a backbone CF peak at −139.9-PPM (1F, integral area=100.0). Integral area calculations indicate that 67.1% of the SO$_2$F groups were hydrolyzed.

EXAMPLE 2

50.1-g of a poly(PSEPVE-co-TFE) copolymer with a equivalent weight of 648-g mol$^{-1}$ (77.4-mmol SO$_2$F) were cut into small pieces and placed in a dry 500-mL 3-neck round bottom (RB) flask. The flask was fitted with mechanical stirring, heating mantle, and a reflux condenser with nitrogen pad. Approximately 175-mL of Freon® E2 was added and the polymer slowly dissolved with stirring and moderate heating (50-60° C.) in 1-2 hours. With 320-RPM stirring, 125-mL of DMF was slowly added by syringe. The mixture was homogeneous with up to about 80-mL of DMF. Further DMF addition afforded a white emulsion. 4.73-g (46.7-mmol) of TEA was then added by pipette followed by addition of about 1.85-g (103-mmol) of water. The emulsion was heated to a gentle reflux and held at temperature for about 1.5-h. Heating was reduced, and the emulsion cooled below reflux temperature. Mechanical stirring was replaced by magnetic stirring and the reflux condenser was replaced with a short path distillation apparatus. The mixture was distilled under vacuum (230-mmHg) at a temperature that started at about 55° C. and climbed to about 79° C. for the duration of the distillation. The majority of the E2 was distilled off leaving a transparent and nearly colorless solution. An additional 50-mL of E2 was added and distilled off under the previous conditions followed by an additional 25-mL of DMF to reduce viscosity. Residual water was measured by KF at about 300-PPM. Weight percent solids was measured by hot plate and subsequent vacuum oven drying (about 60° C., 29.5"-Hg) until constant weight was achieved and found to be 27.7-%. A sample of the dispersion was diluted to approximately 5% (w/w) with acetone-d$_6$. A non-referenced $^{19}$F NMR of the 5% dispersion showed a remaining SO$_2$F peak at about 43.8-PPM (1F, integral area=35.7) and a backbone CF peak at −139.9-PPM (1F, integral area=100.0). Integral area calculations indicate that 64.3-% of SO$_2$F groups were hydrolyzed.

EXAMPLE 3

50.1-g of a poly(PSEPVE-co-TFE) copolymer with a equivalent weight of 648-g mol$^{-1}$ (77.3-mmol SO$_2$F) were cut into small pieces and placed in a dry 500-mL 3-neck round bottom (RB) flask. The flask was fitted with mechanical stirring, heating mantle, and a reflux condenser with nitrogen pad. Approximately 175-mL of Freon E2 was added and the polymer slowly dissolved with stirring and moderate heating (50-70° C.) in about 1 hour. With the solution at about 50-70° C. and about 300-RPM stirring, about 75-mL of DMF was slowly added by syringe. The mixture was colorless and translucent. 4.67-g (58.4-mmol) of 50-% aqueous NaOH was then added slowly over 5 to 10-min. Within a few minutes the mixture started to take on the appearance of a white emulsion. 100-mL of DMF was added and the mixture was heated to a gentle reflux and held at temperature for about 0.5-h. Heating was then stopped, and the product cooled below reflux temperature. Mechanical stirring was replaced by magnetic stirring and the reflux condenser was replaced with a short path distillation apparatus. The mixture was distilled under vacuum (about 150-mmHg) at a temperature that started at about 55° C. and climbed to about 68° C. for the duration of the distillation. The majority of the E2 was distilled off leaving a translucent and slightly yellow dispersion. Water was measured at 0.26-% by KF. An additional 100-mL of E2 was added and distilled off under the previous conditions. Water was again measured by KF and was at 0.093-%. A non-referenced $^{19}$F NMR of an approximately 5% polymer solution that had been diluted with acetone-$d_6$ showed a remaining $SO_2F$ peak at about 43.3-PPM (1F, integral area=44.6) and a backbone CF peak at about –140-PPM (1F, integral area=100). This corresponds to 55.4-% of $SO_2F$ groups having been hydrolyzed. The dispersion was centrifuged leaving a much more transparent slightly yellow dispersion and approximately 4 to 5-mL of a white precipitate, which appeared to be NaF. Weight percent solids was measured by vacuum oven drying (about 80° C., 29.5"-Hg) until constant weight was achieved and found to be 26.4-%.

EXAMPLE 4

50.09-g (69.8-mmol $SO_2F$) of poly(PSEPVE-co-TFE) copolymer having an equivalent weight of 718-g mol$^{-1}$ was cut into small pieces and placed in a 500-mL 3-neck RB flask. The flask was fitted with mechanical stirring, heating mantle, and a reflux condenser with nitrogen pad. About 175-mL of E2 was added and the polymer slowly dissolved with stirring at gentle reflux in about 3 hours. Heating was reduced and the temperature decreased to about 70-90° C. With 350-RPM stirring, a solution of 1.41-g (14.0-mmol) of TEA, 0.50-g of water, and 45-g of DMF was slowly added using a 125-mL pressure equalizing addition funnel. The solution turned translucent upon addition. An additional 104-g of DMF was added through the funnel with the mixture taking on the appearance of a white emulsion. The emulsion was stirred at about 70-90° C. for an additional 1-h. Heating was stopped, and the product cooled below reflux temperature. The condenser was replaced by a nitrogen sparge and the addition funnel was replaced with a short path distillation apparatus. The white emulsion was distilled at atmospheric pressure with the nitrogen sparge and slowly turned transparent and nearly colorless as the E2 was removed. Residual water was measured by KF at about 260-PPM. Weight percent solids was measured by hot plate and subsequent vacuum oven drying (about 60° C., 29.5"-Hg) until constant weight was achieved and found to be 28.3-%. A sample of the dispersion was diluted to approximately 5% (w/w) with acetone-$d_6$. A non-referenced $^{19}$F NMR of the 5% dispersion showed a remaining $SO_2F$ peak at about 44-PPM (1F, integral area=11.1) and a complex peak spanning –70 to –90-PPM corresponding to the two pendant —$OCF_2$— and —$CF_3$ resonances (7F, integral area=100). Integral area calculations indicate that 22.3-% of $SO_2F$ groups were hydrolyzed.

EXAMPLE 5

50.0-g (55.7-mmol $SO_2F$) of poly(PSEPVE-co-TFE) copolymer pellets having an equivalent weight of about 850-g mol$^{-1}$ were placed in a dry Parr® 5100 glass reactor. The reactor was evacuated and 220-mL of Freon® E2 was added by cannula. The reactor was back filled with $N_2$ and vented to atmospheric pressure. The reactor was heated to 125° C. and the pellets dissolved over a period of several hours with 700 to 1000-RPM stirring. 22.6-mL of a 0.100 g/mL TEA solution in DMF (22.3-mmol TEA, 44.6-mmol water) was slowly added (1-mL/min) using a Waters 515® HPLC pump. The maximum reactor pressure was 20-PSIG. An additional 120-mL of DMF was pumped (2-mL min$^{-1}$) into the reactor with the reaction mixture taking on a white emulsion appearance. The emulsion was cooled to <40° C., then transferred to a 1-L 3-neck RB flask fitted with mechanical stirring, a short path distillation apparatus, and a $N_2$ sparge. The emulsion was distilled at atmospheric pressure. The emulsion turned translucent, almost transparent, as the majority of the E2 was removed and the dispersion formed. An additional 90-mL of DMF was added during distillation to reduce viscosity. After cooling to ambient temperature, the nearly transparent dispersion was filtered through polypropylene filter cloth. Weight percent solids was measured by hot plate and subsequent vacuum oven drying (about 60° C., 29.5"-Hg) until constant weight was achieved and found to be 18.6-%. A sample of the dispersion was diluted to approximately 5% (w/w) with acetone-$d_6$. A non-referenced $^{19}$F NMR of the 5% dispersion showed a remaining $SO_2F$ resonance at about 43-PPM (1F, integral area=1.59) and a broad peak centered at about –82-PPM and corresponding to the pendant $CF_3$ and two –$OCF_2$— resonances (7F, integral area=20.00). Integral area calculations indicated that 44.4-% of $SO_2F$ groups were hydrolyzed. The equivalent weight ($SO_2F$ form) was calculated to be 855-g mol$^{-1}$ from the ratio of the –82-PPM resonance integral area to the total integral area (excluding $SO_2F$).

EXAMPLE 6

25.05-g (50.6-mmol $SO_2F$) of a poly(PSEVE-co-TFE), which is a copolymer of tetrafluoroethylene (TFE) and perfluoro(3-oxa-4-pentenesulfonyl fluoride) (PSEVE), having an EW of 495-g mol$^{-1}$, was cut into small pieces and placed in a 500-mL 3-neck RB flask. The flask was fitted with mechanical stirring, heating mantle, and a reflux condenser with nitrogen pad. About 88-mL of Freon® E2 was added and the polymer slowly dissolved with stirring at gentle reflux in about 1 hour. Heating was reduced and the solution was cooled to between 70 and 90° C. With rapid stirring (about 320-RPM), a hydrolysis solution consisting of 0.770-g TEA (7.61-mmol), 0.274-g water (15.2-mmol), and about 28-g of DMF was slowly added over a period of about 15-min using a 125-mL pressure equalizing addition funnel. The mixture was homogeneous and translucent. An additional 110-g of DMF was slowly added and resulted in a white emulsion. Heating was increased and the emulsion was gently refluxed for about 0.5-h. Heating was then stopped, and the emulsion cooled below reflux temperature. The condenser was replaced by a nitrogen sparge and the addition funnel was replaced with a short path distillation apparatus. The emulsion was distilled at atmospheric pressure with a gentle nitrogen sparge and slowly turned transparent and nearly colorless as the E2 was removed. After cooling to ambient temperature, the dispersion was filtered through polypropylene filter cloth. Residual water was measured by KF at about 520-PPM. Weight percent solids was measured by hot plate and subsequent vacuum oven drying (about 60° C., 29.5"-Hg) until constant weight was achieved and found to be 17.2-%. A sample of the dispersion was diluted to approximately 5% (w/w) with acetone-$d_6$. A non-referenced $^{19}$F NMR of the 5% dispersion showed a remaining $SO_2F$ resonance at about 44-PPM (1F, integral area=3.50) and a broad pendent —$OCF_2$— resonance about –82-PPM (2F, integral area=10.00). Integral area calculations indicate that 30.0-% of $SO_2F$ groups were hydrolyzed.

EXAMPLE 7

50.06-g (101-mmol $SO_2F$) of a poly(PSEVE-co-TFE) copolymer (EW=495-g mol$^{-1}$) was cut into small pieces and placed in a 1-L 3-neck RB flask. The flask was fitted with mechanical stirring, heating mantle, and a reflux condenser with nitrogen pad. About 175-mL of E2 was added and the polymer slowly dissolved with stirring at gentle reflux in about 1 hour. Heating was reduced and the solution cooled to between 70 and 90° C. With rapid stirring (about 320-RPM), a hydrolysis solution consisting of 2.04-g TEA (20.2-mmol), 0.727-g water (40.4-mmol), and about 36-g of DMF was slowly added over a period of about 15-min using a 125-mL pressure equalizing addition funnel. The mixture was homogeneous and translucent. An additional 85-g of DMF was slowly added and the mixture took on the appearance of a white emulsion. The emulsion was heated to a gentle reflux and held at temperature for about 0.5-h. Heating was then stopped, and the product cooled below reflux temperature. The condenser was replaced by a nitrogen sparge and the addition funnel was replaced with a short path distillation apparatus. The white emulsion was distilled at atmospheric pressure with the nitrogen sparge and slowly turned transparent and was slightly yellow as the E2 was removed. Residual water was measured by KF at about 170-PPM. Weight percent solids was measured by hot plate and vacuum oven drying (about 60° C., 29.5"-Hg) until constant weight was achieved and found to be 27.2-%. A sample of the dispersion was diluted to approximately 5% (w/w) with acetone-$d_6$. A non-referenced $^{19}$F NMR of the 5% dispersion showed a remaining $SO_2F$ resonance at about 44-PPM (1F, integral area=6.17) and a broad pendent —$OCF_2$— resonance at about –82-PPM (2F, integral area=17). Integral area calculations indicate that 27-% of the $SO_2F$ groups were hydrolyzed.

EXAMPLE 8

25.0-g (42.2-mmol $SO_2F$) of a poly(PSEVE-co-TFE) copolymer (EW=593-g mol$^{-1}$) was cut into small pieces and placed in a 500-mL 3-neck RB flask. The flask was fitted with mechanical stirring, heating mantle, and a reflux condenser with nitrogen pad. About 175-mL of Freon® E2 was added and the polymer slowly dissolved with stirring at gentle reflux in about 1 hour. Heating was reduced and the solution cooled to between 70 and 90° C. With rapid stirring (about 320-RPM), a solution of 1.30-g (12.8-mmol, 0.303-equiv) of TEA, 0.46-g of Di water, and about 19-g of DMF were slowly added using a 125-mL pressure equalizing addition funnel. The solution turned translucent upon addition. An additional 95-g of DMF was added through the funnel with the mixture taking on the appearance of a white emulsion. The mixture was stirred at temperature for an additional 0.5-h. Heating was then stopped, and the product cooled below reflux temperature. The condenser was replaced by a nitrogen sparge and the addition funnel was replaced with a short path distillation apparatus. The white emulsion was distilled at atmospheric pressure with the nitrogen sparge. The dispersion was nearly transparent as the majority of the E2 was removed. After cooling to room temperature, the dispersion was filtered through polypropylene filter cloth. The partial hydrolysis was repeated in essentially the same manner and the two products were combined. Weight percent solids was measured by hot plate and subsequent vacuum oven drying (about 60° C., 29.5"-Hg) until constant weight was achieved and found to be 18.0-%. A sample of the dispersion was diluted to approximately 5% (w/w) with acetone-$d_6$. A non-referenced $^{19}$F NMR of the 5% dispersion showed a remaining $SO_2F$ resonance at about 44-PPM (1F, integral area=3.37) and a broad pendent —$OCF_2$— (2F, integral area=10.0) resonance centered at about –82-PPM. Integral area calculations indicated that 32.6-% of the $SO_2F$ groups were hydrolyzed.

EXAMPLES 9-10

Crosslinkable Agent Formation by Conversion of Dispersion $SO_2F$ Groups to Sulfonamide ($SO_2NH_2$) Groups

EXAMPLE 9

91.8-g (12.8-mmol $SO_2F$) of the dispersion from Example 2 was placed in a dry 250-mL 3 neck RB flask fitted with mechanical stirring, a dry ice condenser with nitrogen pad, and gas addition port. The flask contents were chilled to about 5° C. using an ice water bath. 1.04-g (61.1-mmol) of ammonia was added using a mass flow integrator at a rate between 120 and 130-mg/min. The mixture turned cloudy as ammonia was added. The flask contents were stirred at the ice water bath temperature for 0.5-h. The bath was removed and the flask contents warmed to ambient temperature with stirring overnight. The dry ice condenser and the ammonia addition port were removed and replaced with a nitrogen pad adapter, a short path distillation apparatus, and a heating mantle. About 6-mL of TEA was added and the RB flask was heated with stirring and gentle nitrogen sparge to effect conversion of ammonium cations to triethylammonium cations. The cloudy dispersion turned transparent and was slightly yellow starting at around 70° C. Heating was stopped when no more residual TEA was observed to be collecting in the receiver flask. Weight percent solids were measured by vacuum oven drying (about 60 to 90° C., 29.5"-Hg) until constant weight was achieved and found to be 31.1%. The disappearance of remaining $SO_2F$ groups and presence of $SO_2NH_2$ groups were confirmed by $^{19}$F NMR, and FTIR spectroscopy of a thin film cast from the dispersion. NH absorption centered at about 3200-cm$^{-1}$ and the disappearance of the remaining $SO_2F$ absorption at about 1470-cm$^{-1}$ were confirmed.

EXAMPLE 10

75-g of the dispersion from Example 1 (9.71-mmol $SO_2F$) were placed in a dry 250-mL 3 neck RB flask fitted with mechanical stirring, a dry ice condenser with nitrogen pad, and ammonia addition port. The flask contents were chilled to about 5° C. using an ice water bath. 0.65-g (38.2-mmol) of ammonia was added using a mass flow integrator at a rate between 120 and 130-mg/min. The mixture turned cloudy as ammonia was added. The flask contents were stirred at the ice water bath temperature for 0.5-h. The bath was removed and the flask contents warmed to ambient temperature with stirring over 2 to 3-h. The dry ice condenser and the ammonia addition port were removed and replaced with a nitrogen pad adapter, a short path distillation apparatus, and a heating mantle. About 6-mL of TEA was added and the RB flask was heated with stirring and a gentle nitrogen sparge to effect conversion of ammonium cations to triethylammonium cations and remove ammonia and excess TEA. The cloudy dispersion turned transparent and slightly yellow starting at around 70° C. Heating was stopped when no more TEA was observed to be collecting in the receiver flask. Once cooled to ambient temperature, weight percent solids were measured by vacuum oven drying (about 60-90° C., 29.5"-Hg) until constant weight was achieved and found to be 28.3%. The disappearance of remaining $SO_2F$ groups and presence of $SO_2NH_2$ groups were confirmed by $^{19}$F NMR, and FTIR spectroscopy of a thin film cast from the dispersion. NH absorption centered at about 3200-cm$^{-1}$ and the disappearance of the remaining SO$_2$F absorption at about 1470-cm$^{-1}$ were confirmed.

EXAMPLES 11-14

Membrane Fabrication, Cross-Linking, and Hydrolysis Acid Exchange

EXAMPLE 11

A mixture consisting of 3 parts by weight of the dispersion in Example 2 and 2 parts by weight of the polymeric cross-linking agent of Example 9 was prepared. A membrane from this mixture was cast on 2-mil thick Mylar® (tacked to glass) using a draw down knife with a 0.025" gap. The membrane on Mylar®/glass was gently heated (about 50° C.) on a level hot plate to evaporate DMF. The membrane was subsequently removed from the glass and subjected to a further drying/annealing step at 150° C. for 5 minutes in a forced air oven. The membrane thickness after annealing was 74±2-μm. Two 46-mm diameter circular pieces were cut from the film. With the Mylar backing still in place, one of the pieces was subjected to a crosslinking step in which it was immersed in 15-mL of an anhydrous organic base, N,N,N',N'-tetramethylethylenediamine (TMEDA), under gentle reflux for 3 hours. Both pieces were subsequently subjected to a hydrolysis step where each piece was independently placed in a 125-mL Erlenmeyer flask containing 40-mL of a 23-% (w/w) potassium hydroxide solution in water/ethanol (4:1). Upon heating, the piece that had not been subjected to the crosslinking step readily dispersed in the hydrolysis mixture leaving the Mylar® backing film. The piece that had been subjected to crosslinking separated from the Mylar® backing film, was somewhat swollen, but otherwise remained intact with refluxing of the hydrolysis solution. The crosslinked film was further subjected to two acid exchanges in concentrated nitric acid, and finally rinsed with deionized water until the rinse pH was ≧6 as measured using universal pH paper. The diameter of the water soaked film was 50±1-mm while the thickness was 88=2-μm. The EW was measured by titration and vacuum oven drying and was 725-g mol$^{-1}$.

EXAMPLE 12

55.35-g of the partially hydrolyzed poly(PSEPVE-co-TFE) dispersion of Example 4 was added to a clean and dry 250-mL RB flask fitted with a septum. With magnetic stirring and ice bath cooling, 4.57-g of a 1.99% ethylenediamine (EDA) solution (1.52-mmol) in DMF was slowly added using a 5-cc glass syringe. The ice bath was removed after EDA addition and the dispersion was stirred for 1-h while warming to ambient conditions. The dispersion was filtered using ~10-μm polypropylene filter cloth and a membrane was cast onto 2-mil thick Mylar® (tacked to glass) using a casting knife with a 0.020" gap. The wet film on Mylar®/glass was gently heated (about 50° C.) on a level hot plate to evaporate DMF. The dry membrane on Mylar® was subsequently removed from the glass and subjected to a further drying/annealing step at 150° C. for 5 minutes in a forced air oven. Dry membrane thickness was about 50-μm. Two 46-mm diameter circular pieces were cut from the membrane. With the Mylar® backing still in place, one of the pieces was subjected to a crosslinking step in which it was immersed in 15-mL of TMEDA and gently refluxed for 3 hours. Both pieces were subsequently subjected to a hydrolysis step where each piece was independently placed in a 125-mL Erlenmeyer flask containing 40-mL of a 23-% (w/w) potassium hydroxide solution in water/ethanol (4:1). Upon heating, the piece that had not been subjected to the crosslinking step partially dissolved suggesting that some cross-linking had occurred during annealing. The piece that had been subjected to crosslinking separated from the Mylar® backing, was somewhat swollen, but otherwise remained intact with refluxing of the hydrolysis solution. The crosslinked membrane was further subjected to two acid exchanges in concentrated nitric acid, and finally rinsed with deionized water until the rinse pH was ≧6 as measured using universal pH paper.

EXAMPLE 13

5.51-g (1.64-mmol SO$_2$F) of the partially hydrolyzed poly(PSEPVE-co-TFE) dispersion of Example 4 and 0.265-g (0.736-mmol) NH$_2$SO$_2$(CF$_2$)$_4$SO$_2$NH$_2$ were added to a dry 20-cc glass vial. The NH$_2$SO$_2$(CF$_2$)$_4$SO$_2$NH$_2$ readily dissolved in the dispersion with magnetic stirring. A membrane was cast by pouring the dispersion onto 2-mil thick Mylar® (tacked to glass). The membrane on Mylar®/glass was gently heated (about 50° C.) on a level hot plate to evaporate DMF. The dry membrane on Mylar® was subsequently removed from the glass and subjected to a further drying/annealing step at 150° C. for 5 minutes in a forced air oven. The dry membrane was completely transparent and the thickness was about 100-μm. The annealed membrane was trimmed of excess Mylar® and with the backing in place, was subjected to a cross-linking reaction by exposure to refluxing TMEDA over LiH for several hours. The membrane was then hydrolyzed using 23-% (w/w) potassium hydroxide solution in water/ethanol (4:1) at ambient temperature overnight. After hydrolysis, the Mylar® backing was easily removed. The membrane was acid exchanged in refluxing 35-% nitric acid for 2-h. The membrane was then rinsed with deionized water, acid exchanged again with 2-M HCL, and finally rinsed with deionized water. A small membrane piece was titrated and the equivalent weight was 770-g/mol.

EXAMPLE 14

50.0-g (9.70-mmol SO$_2$F) of the partially hydrolyzed poly(PSEVE-co-TFE) dispersion of Example 8 and 1.16-g (3.22-mmol) NH$_2$SO$_2$(CF$_2$)$_4$SO$_2$NH$_2$ were added to a dry 250-mL RB flask. The NH$_2$SO$_2$(CF$_2$)$_4$SO$_2$NH$_2$ readily dissolved in the dispersion with magnetic stirring. The homogenous mixture was then filtered through ~10-μm polypropylene filter cloth. An 8"×10" casting surface was assembled with a 2-mil Mylar® film that was water tacked to a glass substrate. The glass substrate was placed on an aluminum plate that was gently heated (~50° C.) using a small hot plate. The Mylar®, glass substrate, aluminum table, and hot plate assembly were placed on an adjustable support table and leveled. Meanwhile, a 10" diameter circular piece of 0.001" thick microporous polytetrafluoroethylene (ePTFE) was supported in an embroidery hoop, and sprayed with a 0.5-% (w/v) triethylammonium salt solution of Zonyl® 1033D in ethanol. The ethanol was evaporated with a dry nitrogen stream.

A 7" wide casting knife with an adjustable blade was set up with a 0.008" gap. The casting knife was lined up on the table approximately 0.75" from the back end, facing forward. Approximately 6-mL of the dispersion mixture was carefully placed (avoiding entrained bubbles) on the table within the space defined by the casting knife blade and side supports. The knife was then drawn forward towards the front of the table. The prepared ePTFE substrate was centered on the table and the dispersion soaked in the substrate. The embroidery hoop was removed and a cover with a dry nitrogen sparge inlet and outlet was placed over the entire table assembly. After 1-h, the membrane was sufficiently dry and a second dispersion layer was applied in essentially the same manner as the first layer. The cover was replaced over the entire assembly, and the dry nitrogen sparge was restarted. The membrane was effectively dry after ~1-h. The membrane, still attached to Mylar®, was removed from the casting table and annealed at 150° C. for 2 minutes in a forced air oven. The membrane was then pealed from the Mylar® backing and supported in a 6.5" diameter stainless steel embroidery hoop.

The supported membrane was placed horizontally in a shallow 8" dia. kettle, fitted with reflux condenser and dry nitrogen pad. The membrane was crosslinked by exposure to the vapor of refluxing TMEDA over LiH. The membrane surfaces were approximately 1" from the refluxing TMEDA. The crosslinking step was stopped after 1-h. The supported membrane was then hydrolyzed in 15-% aqueous KOH at 70 to 90° C. for 30 minutes and then rinsed of excess KOH using deionized water. The supported films were acid exchanged with 2-M $HNO_3$ for 30 minutes then rinsed of excess acid with Di water. A second acid exchange was done with 35-% $HNO_3$ at reflux for 30 minutes. Finally, the membrane was rinsed with DI water, acid exchanged with 2-M $HNO_3$, rinsed with DI water, then air dried overnight before being removed from the embroidery hoop. The dry membrane thickness was 35-μm.

What is claimed is:

1. A method to produce a polymer dispersion, comprising the steps of:
   a) providing a solution comprising a solvent for a polymer and said polymer containing pendant $SO_2X$ groups, wherein the polymer comprises a fluorinated backbone and pendant groups described by the formula —(O—$CF_2CFR_f)_a$—(O—$CF_2)_b$—$(CFR'_f)_cSO_2X$, where X is a halogen, $R_f$ and $R'_f$ are independently selected from F, Cl or a perfluorinated alkyl group having 1 to 10 carbon atoms, a=0 to 2, b=0 to 1, and c=0 to 6;
   b) combining the solution of step a) with a nucleophilic compound Y and a polar liquid, to form a reaction mixture; and
   c) removing by distillation substantially all of the solvent used in step (a) for dissolving the polymer containing pendant —$SO_2X$ group from the reaction mixture of step b) to form a dispersion wherein about 5% to about 95% of the pendant $SO_2X$ groups have reacted with the nucleophilic compound Y and about 95% to about 5% of the pendant $SO_2X$ groups remain unreacted.

2. The method of claim 1 wherein in step b) the polar liquid and the nucleophilic compound Y are mixed together before being combined with the solution of step a).

3. The method of claim 1 wherein in step c) about 25% to about 75% of the pendant $SO_2X$ groups have reacted with the nucleophilic compound Y and about 75% to about 25% of the pendant $SO_2X$ groups remain unreacted.

4. The method of claim 1 additionally comprising the step of adding a compound of the formula $HNR^1R^2$ to the dispersion formed in step c) or the reaction mixture formed in step b) so that about 1% to about 100% of the remaining pendant $SO_2X$ groups are converted to pendant $SO_2NR^1R^2$ groups, wherein $R^1$ and $R^2$ are independently hydrogen or optionally substituted alkyl or aryl groups.

5. The method of claim 1 wherein the polar liquid is selected from DMF, DMAC, NMP, DMSO, acetonitrile, propylene carbonate, methanol, ethanol, water, or a combination thereof.

6. The method of claim 1 wherein X is F.

7. The method of claim 1 wherein the solvent for the polymer is fluorinated.

8. The method of claim 6 wherein the solvent for the polymer is selected from a fluorocarbon, fluorocarbon ether, hydrofluorocarbon, hydrofluorocarbon ether, chlorofluorocarbon, chlorofluorocarbon ether, 2H-perfluoro(5-methyl-3,6-dioxanonane, or any combination thereof.

9. The method of claim 6 wherein the solvent for the polymer comprises a fluorinated electronic liquid.

10. The method of claim 1 wherein the nucleophilic compound Y is water and the water is admixed with a non-nucleophilic base.

11. The method of claim 10 wherein the non-nucleophilic base is selected from LiH, NaH, and $NR^4R^5R^6$, wherein $R^4$, $R^5$ and $R^6$ are optionally substituted alkyl groups.

12. The method of claim 1 wherein the nucleophilic compound Y is selected from LiOH, NaOH, KOH, CsOH, or a combination thereof.

13. The method of claim 1 wherein in step c) the pendant $SO_2X$ groups have reacted to $SO_3M$, wherein M is a univalent cation.

14. The method of claim 1 wherein the polymer of step a) comprises pendant groups of the formula —O—$CF_2CF$($CF_3$)—O—$CF_2CF_2SO_2F$ or —$OCF_2CF_2SO_2F$, or any combination thereof.

15. The method of claim 14 wherein the polymer of step a) is perfluorinated

16. A dispersion made by the method of claim 1.

17. A dispersion made by the method of claim 4.

18. A membrane prepared from the dispersion of claim 16.

19. The membrane of claim 18, wherein the membrane is a reinforced membrane incorporating an expanded, microporous, or fibrilar reinforcement material.

20. A membrane prepared from the dispersion of claim 17.

21. The membrane of claim 20, wherein the membrane is a reinforced membrane incorporating an expanded, microporous, or fibrilar reinforcement material.

22. The method of claim 1 wherein the nucleophilic compound Y is $HNR^1R^2$, wherein $R^1$ and $R^2$ are independently hydrogen or optionally substituted alkyl or aryl groups.

23. The method of claim 1 additionally comprising the step of adding a compound of the formula $HNR^1R^2$ to the dispersion formed in step c) or the reaction mixture formed in step b), wherein $R^1$ and $R^2$ are independently hydrogen or optionally substituted alkyl or aryl groups.

* * * * *